United States Patent [19]

Iwamoto et al.

[11] 4,400,944
[45] Aug. 30, 1983

[54] AIR-FUEL RATIO CONTROL METHOD AND APPARATUS FOR INTERNAL COMBUSTION ENGINES

[75] Inventors: Kenzi Iwamoto, Nishio; Makoto Kuroyanagi, Hekinan; Hisasi Kawai, Toyohashi; Kunimasa Yoshimura, Susono; Hidetaka Nohira, Mishima; Mitsuyuki Ugajin, Susono; Hisashi Ohki, Numazu, all of Japan

[73] Assignees: Nippon Soken, Inc., Nishio; Toyota Jidosha Kogyo Kabushiki Kaisha, Toyota, both of Japan

[21] Appl. No.: 212,333

[22] Filed: Dec. 2, 1980

[30] Foreign Application Priority Data

Dec. 4, 1979 [JP] Japan .................... 54-157637

[51] Int. Cl.³ .................... F02B 37/00; F02D 3/00
[52] U.S. Cl. .................... 60/605; 123/489
[58] Field of Search .................... 123/440, 489; 60/276, 60/605

[56] References Cited

U.S. PATENT DOCUMENTS 4,274,381  6/1981  Abo .................... 123/440 X

FOREIGN PATENT DOCUMENTS 744424  1/1944  Fed. Rep. of Germany ...... 123/489
801587  5/1936  France .................... 60/605

Primary Examiner—Michael Koczo
Attorney, Agent, or Firm—Cushman, Darby & Cushman

[57] ABSTRACT

The temperature and air-fuel ratio of the exhaust gases of an internal combustion engine are sensed to generate signals indicative thereof and the amount of fuel to be injected into the engine is determined in accordance with the signals, thus controlling the air-fuel ratio at a predetermined value and thereby decreasing the abnormal temperature rise in the exhaust system.

15 Claims, 4 Drawing Figures

AIR-FUEL RATIO CONTROL METHOD AND APPARATUS FOR INTERNAL COMBUSTION ENGINES

BACKGROUND OF THE INVENTION

The present invention relates to air-fuel ratio control apparatus for internal combustion engines, and more particularly to apparatus for optimally controlling the air-fuel ratio of an engine in accordance with the engine operating conditions so as to prevent thermal breakdown of the supercharger and the exhaust system components and reduce fuel consumption.

Generally, the compression of an intake mixture supplied to an engine by a supercharger is accompanied with an increase in the intake air temperature supercharging necessitates decreasing the turbine inlet nozzle area for exhaust gases as far as possible so as to ensure rise in the supercharged pressure and hence the supercharging effect at the low engine speeds. However this increases exhaust pressure at high engine speeds and increases the tendency of knocking with ordinarily used gasoline fuel.

More specifically, under high speed and high load operating conditions the engine is operated with an ignition timing greatly retarded with respect to the optimum ignition timing, MBT (minimum spark advance for best torque) for the air-fuel mixture supplied to the combustion chamber. As a result, the exhaust gas temperature becomes extremely high so that the supercharger installed in the exhaust system and the exhaust system components are exposed to elevated temperatures and are faced with the danger of breaking down by heat. At the same time, output power is restricted by knocking with a resulting increase in fuel consumption. Thus, to overcome these deficiencies, it is already known in the art to use either fuels having a large ignition lag, in place of ordinary gasoline, so as to increase the ignition lag required for initial combustion or an additive such as tetraethyl lead or a mixture of a fuel having a good antiknock properties (e.g., benzol or alcohols) and ordinary gasoline. However, these measures are not practical in that a change of fuel is not desirable so far as the matter concerns gasoline engines and the addition of lead is contrary to the recent trend toward using clear gasolines. Also the addition of any other fuel to ordinary gasoline requires a device for this particular purpose with the resulting increase in the cost. Further, recently the use of clear gasolines must be a prerequisite in view of the demand for minimized emissions.

Other measures intended for pushing back the ignition timing at which knock begins to occur have been investigated and they include reducing the compression ratio to minimize the temperature and pressure of the exhaust gas in the combustion process, using a variable compression ratio construction, modifying the combustion chamber into a swirl producing construction which increases the flame speed, etc. However, the reduced compression ratio decreases fuel consumption under part-load operation, and the variable compression ratio construction and the modified combustion chamber shape are disadvantageous from the standpoints of structural complexity, reliability and increased cost.

Where the use of a clean gasoline is presupposed and the compression ratio is not modified particularly, the most simple and inexpensive method of decreasing the elevated exhaust gas temperature under high speed and high load operation is to vary the air-fuel ratio of mixture. In the case of gasoline engines, generally the air-fuel ratio at high engine speed and load, is kept considerably rich as compared with that at low engine speed and load so as to push back the knock limit to thereby decrease the exhaust gas temperature and restore the output power. In this case, depending on the air-fuel ratio control method used, there is the danger that a supercharger installed in the exhaust system and the exhaust system components may be damaged by heat, with the fuel consumption of the engine being inevitably increased.

SUMMARY OF THE INVENTION

It is the object of the present invention to provide an improved air-fuel ratio control apparatus which eliminates the foregoing deficiencies in the prior art. The present invention is capable of controlling the air-fuel ratio of mixtures in accordance with the operating conditions of an engine in an optimum manner such that the exhaust gas temperature is prevented from exceeding the heat resistance temperatures of the exhaust system component parts. This positively prevents the supercharger and the exhaust system components from being damaged by heat, thus reducing fuel consumption.

DESCRIPTION OF THE PREFERRED EMBODIMENT

The present invention will now be described in greater detail with reference to the illustrated embodiment.

Figure 1:
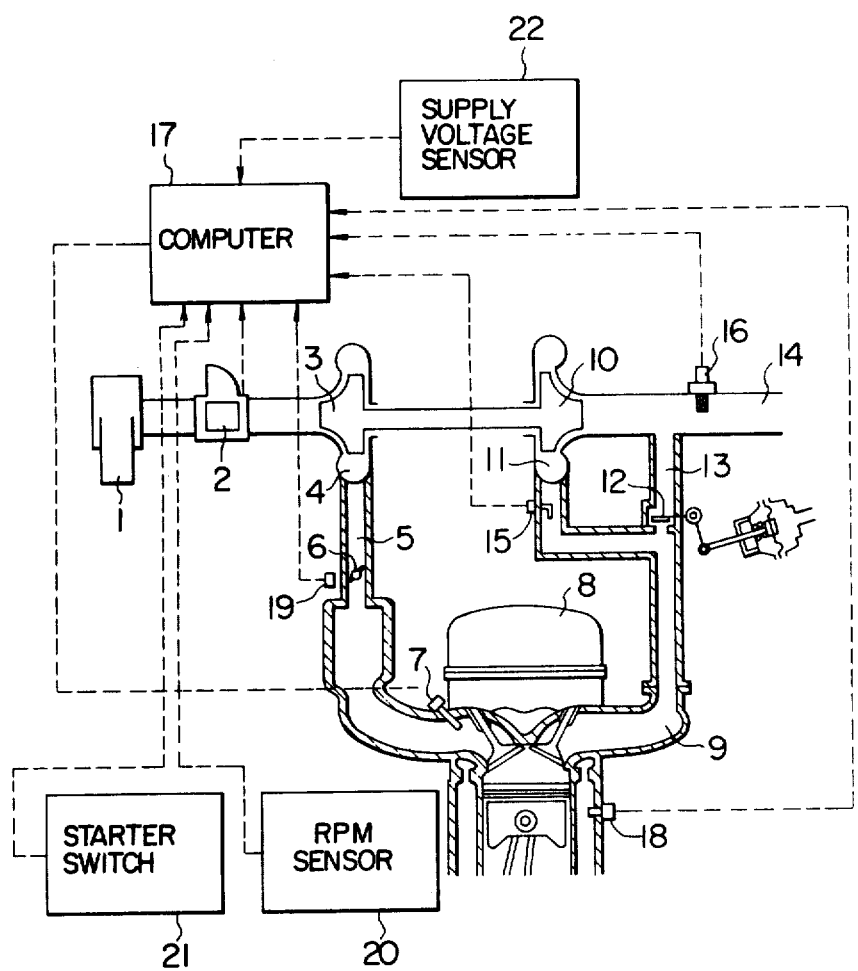
FIG. 1 is a schematic diagram showing the overall construction of an embodiment of the present invention.

Referring to FIG. 1 showing the construction of an air-fuel ratio control apparatus for an internal combustion engine, numeral 1 designates an air cleaner for cleaning the air to be drawn in, 2 an air-flow meter for measuring the amount of air drawn into an engine 8, and 3 a compressor impeller of a supercharger for compressing and supercharging the intake air measured by the air-flow meter 2. The compressor impeller 3 is linked to a turbine impeller 10 by a common shaft and mounted inside a compressor housing 4. Numeral 5 designates an engine intake pipe in which is disposed a throttle valve 6 linked to the accelerator pedal which is not shown. Numeral 7 designates a fuel charging injector fitted in the inlet port portion of the engine 8 and operable in response to the signal applied from a computer 17 which will be described later. While, in FIG. 1, only the single injector 7 is shown, it is possible to provide as many injectors 7 as there are cylinders in the engine 8. Numeral 9 designates an exhaust manifold for conducting the high temperature exhaust gases produced by the combustion in the engine 8, and mounted on the downstream part of the exhaust manifold 9 is a supercharger turbine casing 11 having the turbine impeller 10 mounted therein. Numeral 12 designates a bypass valve so designed that the exhaust gases discharged from the engine 8 may bypass the turbine casing 11 so as to prevent the supercharged pressure in the intake pipe 5 from exceeding a preset maximum. The operation of the bypass valve 12 may be feedback controlled by, for example, the pressure in the intake pipe 5. The exhaust gases which pass through the bypass valve 12 flow through a bypass pipe 13 into an exhaust pipe 14 where they join with the exhaust gases which were discharged from the turbine impeller 10, and the exhaust gases are then discharged to the atmosphere through an exhaust gas purifying catalyst and an exhaust muffler which are not shown. Numeral 15 designates a temperature sensor for sensing the temperature T of the exhaust gases flowing into the turbine casing 11 and applying its detection signal to the computer 17. Numeral 16 designates an $O_2$ sensor forming an air-fuel ratio sensor for sensing the air-fuel ratio of mixtures, 18 a water temperature sensor for sensing the cooling water temperature of the engine 8, 19 a throttle position sensor for sensing the position of the throttle valve, 20 an RPM sensor for sensing the number of revolutions of the engine 8, 21 a starter switch for detecting whether the starter is in operation or not, and 22 a supply voltage sensor for sensing the battery voltage. The detection signals of these sensors are applied to the computer 17.

Figure 2:
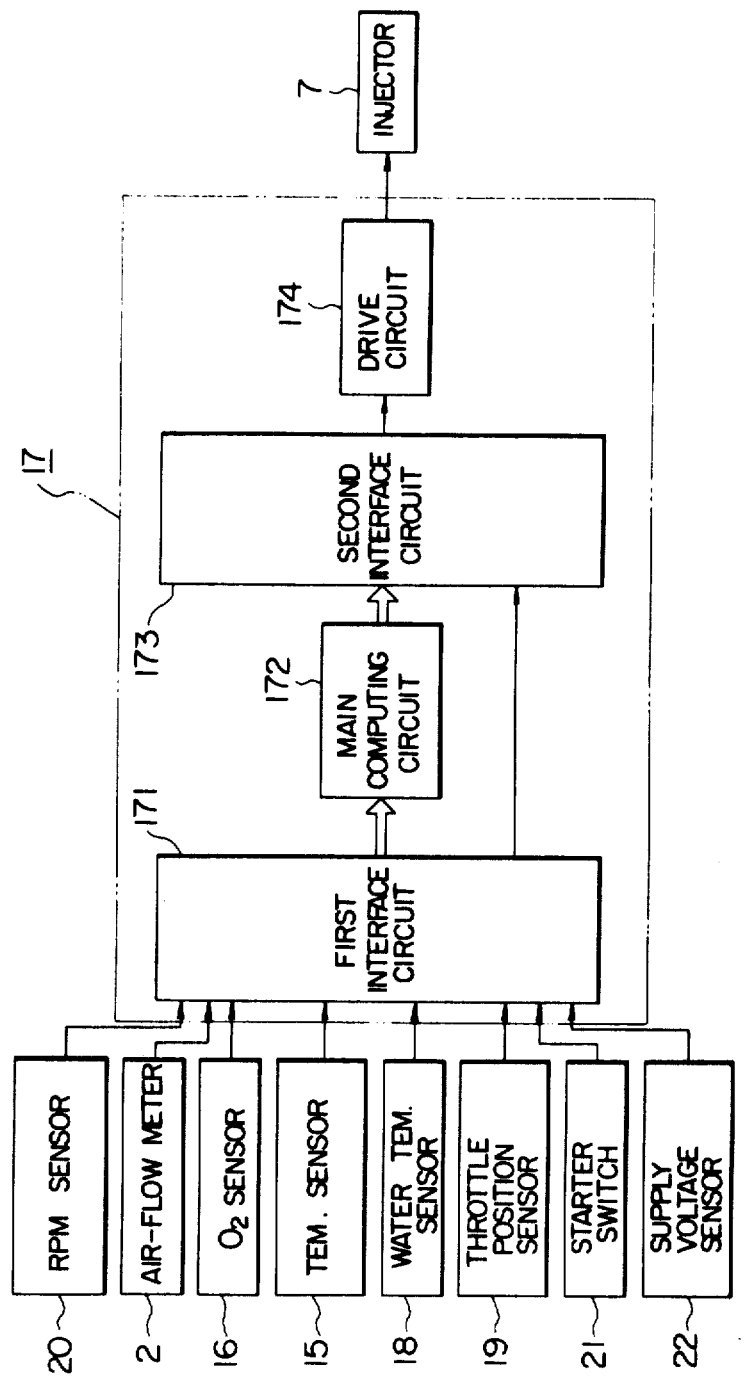
FIG. 2 is a block diagram showing the construction of the computer shown in FIG. 1.

In FIG. 2 showing the construction of the computer 17, numeral 171 designates a first interface circuit for reshaping its various input signals, generating a computer interrupt request signal pulse, converting the analog signals to digital signals and generating clock signals. Numeral 172 designates a main computing circuit which in this embodiment comprises a microcomputer designed to perform various computational operations in time-shared manner by means of a software. The construction and operation of the microcomputer are well known in the art and will not be described. Numeral 173 designates a second interface circuit for converting the computation result of the main computing circuit 172 into a pulse width in accordance with the signal from the first interface circuit 171. Numeral 174 designates a drive circuit for subjecting the output signal of the second interface circuit 173 to power amplification and actuating the injector 7.

The operation of the apparatus of this invention will now be described briefly. A basic quantity $\tau_o$ of fuel to be injected into the engine 8 is computed in accordance with the signal from the RPM sensor 20 and the signal from the air-flow meter 2. If N represents the engine rpm and Q represents the amount of air flow, the basic injection quantity $\tau_o$ is given by Q/N. On the other hand, an exhaust gas temperature correction amount $\Delta\tau$ is determined in accordance with the output signal of the temperature sensor 15 which is indicative of the exhaust gas temperature T, and an injection quantity $\tau$ is computed in accordance with a correction amount $\Delta\tau_o$ determined in accordance with the signals from the $O_2$ sensor 16, the water temperature sensor 18, the throttle position sensor 19, the starter switch 21 and the supply voltage sensor 22. The injection quantity $\tau$ is given by (Q/N) $(1+\Delta\tau_o+\Delta\tau)$.

Figure 3:
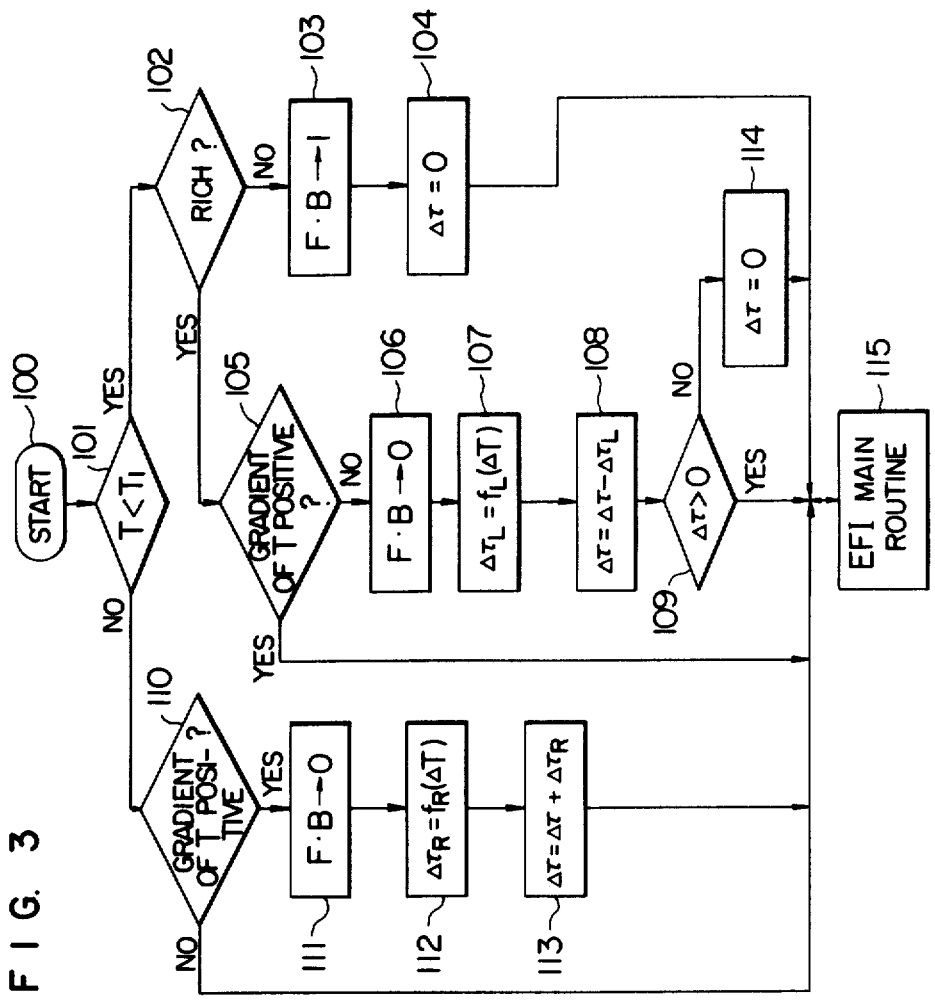
FIG. 3 is a flow chart showing the computing procedure of the computer shown in FIG. 1.

FIG. 3 is a flow chart showing the computing procedure for obtaining the exhaust gas temperature correction amount $\Delta\tau$ relating to the exhaust gas temperature. Firstly, the fuel injection quantity corresponding to the stoichiometric air-fuel ratio (the air-excess ratio $\lambda=1$) is determined by a main routine (hereinafter referred to as an EFI main routine) and the fuel is injected by the injector 7 into the engine 8. When the clock signal generated at intervals of 1 sec is applied as an interrupt request signal to the main computing circuit 172 from the first interface circuit 171, a step 100 starts an exhaust gas temperature correction routine. A step 101 determines whether the temperature T of the exhaust gases flowing into the turbine casing which was sensed by the temperature sensor 15 is less than a predetermined value $T_1$ ($\approx 900°$ C.). If $T < T_1$, the control is transferred to a step 102, whereas if $T < T_1$, the control is transferred to a step 110. $T < T_1$ corresponds to the low and intermediate speed and load operations of the engine and $T < T_1$ corresponds to the high speed and load operation. The step 102 determines whether the signal from the $O_2$ sensor 16 is at a high level (rich mixture) or a low level (lean mixture). If the mixture is rich, the control is transferred to a step 105. If it is not, the control is transferred to a step 103. The step 103 connects the feedback (F-B) circuit which is designed so that in accordance with the signal from the $O_2$ sensor 16 the air-fuel ratio is controlled by the EFI main routine 115 so as to attain $\lambda=1$ and in this way the air-fuel ratio is controlled at the stoichiometric ratio. A step 104 sets the exhaust gas temperature correction amount $\Delta\tau$ to 0 and then the control is transferred to the EFI main routine 115. If the step 102 determines that the mixture is rich, the control is transferred to the step 105 which in turn determines whether the gradient of the exhaust gas temperature T is positive with respect to the passage of time. If the gradient is positive, the control is transferred to the EFI main routine 115. If the gradient is not positive, the control is transferred to a step 106 which in turn disconnects the feedback circuit. A step 107 computes a decrement $\Delta\tau_L = f(\Delta T)$ corresponding to $T_1 - T = \Delta T$. A step 108 subtracts the decrement $\Delta\tau_L$ computed by the step 107 from the current exhaust gas temperature correction amount $\Delta\tau$ and the resulting value becomes a new exhaust gas temperature correction amount. A step 109 determines whether the difference value $\Delta\tau$ is positive or negative. If it is positive, the control is transferred to the EFI main routine 115, whereas if it is not positive, the control is transferred to a step 114. The step 114 sets the exhaust gas temperature correction amount $\Delta\tau$ to 0 and then the control is transferred to the EFI main routine 115.

The step 110 determines whether the gradient of the exhaust gas temperature T is positive with respect to the passage of time. If the gradient is positive, a step 111 disconnects the feedback circuit. A step 112 computes an increment $\Delta\tau_R = f_R$ ($\Delta T$) corresponding to $T - T_1 = \Delta T$, and then the next step 113 adds the increment $\Delta\tau_R$ to the current exhaust gas temperature correction amount $\Delta\tau$ to obtain a new exhaust gas temperature correction amount. Then the control is transferred to the EFI main routine 115. If the step 110 determines that the gradient of the temperature T is not positive, the control is directly transferred to the EFI main routine 115. The processing of the steps 110 to 113 is such that with the exhaust gas tmperature T being higher than the predetermined value $T_1$, if the temperature T rises further, the feedback circuit is disconnected so that the correction amount $\Delta\tau$ is increased and the air-fuel ratio is enriched thus decreasing the exhaust gas temperature T, whereas if the temperature T decreases, the control is effected with the current correction amount $\Delta\tau$ maintained as such. The determination of the temperature gradient by the step 110 is effected in accordance with the difference between the preceding data and that obtained 1 second later.

Figure 4:
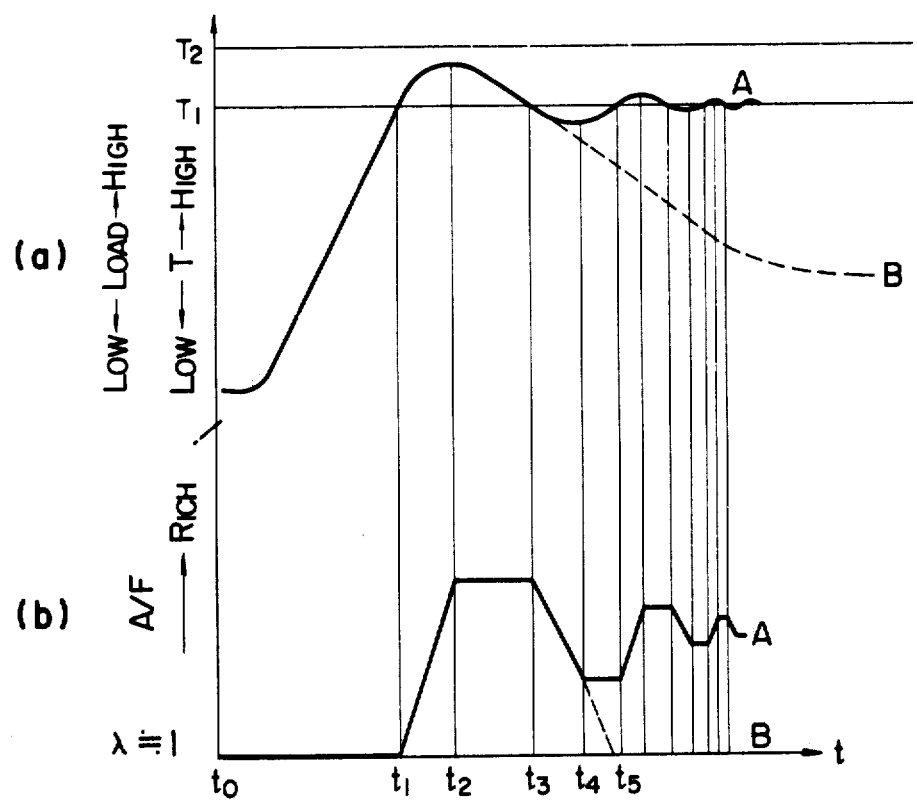
FIG. 4 is a characteristic diagram useful for explaining the operation of the apparatus of the invention.

The above-described control characteristics of the fuel injection quantity are graphically represented by FIG. 4 in which (a) shows the variations of the exhaust gas temperature T and the load and (b) shows the variations of the air-fuel ratio (A/F). In FIG. 4, the solid lines A show the characteristics obtained under the operating conditions of the engine 8 ranging from the acceleration operation to the continuous high load operation and the broken lines B indicate the characteristics obtained under the part load steady operation. For instance, during the interval from $t_0$ to $t_1$ the exhaust gas temperature T is lower than the preset value $T_1$ so that the air-fuel ratio is controlled substantially at the stoichiometric air-fuel ratio ($\lambda \approx 1$), whereas when the temperature T exceeds the preset value $T_1$ as during the interval $t_1$ to $t_2$, the air-fuel ratio is controlled to gradually increase in richness so that the temperature T starts decreasing (during the interval $t_2$ to $t_3$) and thus the air-fuel ratio is practically held at the value of the time when the temperature T started decreasing. Thereafter, when the temperature T becomes lower than the preset value $T_1$ (during the interval $t_3$ to $t_4$), the air-fuel ratio is controlled to approach the stoichiometric ratio (on the lean side). However, under the continuous high load operation the temperature T starts increasing again as shown by the solid line A (during the interval $t_4$ to $t_5$) so that the air-fuel ratio is substantially held constant and thereafter the air-fuel ratio is controlled in the same manner as mentioned previously. On the other hand, during the part load steady operation the temperature T starts decreasing after the time $t_3$ as shown by the broken line B and thus the air-fuel ratio is controlled at the stoichiometric ratio.

It will thus be seen from the foregoing that in accordance with the present invention, by virtue of the fact that the air-fuel ratio is controlled by detecting the temperature of the exhaust gases flowing into the turbine casing of the supercharger, the exhaust gas temperature is prevented from exceeding the heat proof temperature limits of the supercharger and the exhaust system components and the fuel quantity is not increased without purpose, thus making the apparatus effective in improving the thermal reliability and improving the fuel consumption.

We claim:

1. A method of controlling the air-fuel ratio of an internal combustion engine comprising the steps of:
    sensing the amount of air sucked into the engine to generate an intake signal;
    sensing the temperature of the exhaust gases of said engine to generate a temperature signal;
    sensing the air-fuel ratio by monitoring the composition of said exhaust gases to generate a ratio signal;
    discriminating whether the temperature of the exhaust gases is lower than a predetermined value on the basis of said temperature signal;
    first determining with a microcomputer, in response to said intake signal and said ratio signal, the amount of fuel to be injected to cause the air-fuel ratio to approach a stoichiometric air-fuel ratio on the basis of said ratio signal when the temperature of exhaust gases is lower than said predetermined value;
    second predetermining with a microcomputer, in response to said intake signal and said ratio signal the injection fuel amount to cause the air-fuel ratio to become rich on the basis of said air-fuel ratio signal when the exhaust gas temperature is higher than the predetermined value; and
    injecting the fuel into said engine on the basis of said determining steps.

2. A method according to claim 1, further comprising the step of supercharging the amount of air supplied to said engine by a compressor coupled by a common shaft to a turbine disposed to be driven by the exhaust gases flowing through an exhaust pipe of said engine, and wherein said temperature sensing step senses the temperature of the exhaust gases flowing into a casing of said turbine.

3. An air-fuel ratio control apparatus for an internal combustion engine comprising:
    means for sensing the amount of air sucked into the engine;
    temperature sensor means for sensing the temperature of the exhaust gases of said engine to generate a temperature signal;
    air-fuel ratio sensor means for sensing the air-fuel ratio by monitoring the composition of said exhaust gases to generate a ratio signal;
    microcomputer means, responsive to said temperature signal and said ratio signal for (1) determining response to said temperature signal whether the temperature of the exhaust gases is lower than a predetermined value; (2) determining in response to said intake signal and said ratio signal; the amount of fuel to be injected to cause the air-fuel ratio to approach a stoichiometric air-fuel ratio when the temperature of exhaust gases is lower than the predetermined value; and (3) determining in response to said intake signal and said ratio signal the injection fuel amount to cause the air-fuel ratio to become rich when the exhaust gas temperature is higher than the predetermined value; and
    injector means, responsive to said microcomputer for injecting fuel into the engine.

4. An apparatus according to claim 3, further comprising supercharger means including a turbine disposed to be driven by the exhaust gases flowing into an exhaust pipe of said engine and a compressor coupled to said turbine by a common shaft and operable to supercharge the amount of air supplied to said engine, and wherein said exhaust gas temperature sensor means is disposed to sense the temperature of the exhaust gases flowing into a turbine casing of said supercharger means.

5. A method according to claim 1 wherein said second determining step further includes the steps of:
    determining the difference between said exhaust gas temperature and said predetermined value;
    determining a correction amount from said difference; and
    correcting the injection fuel amount by said correction amount.

6. A method according to claim 5 wherein said correction amount determining step includes the steps of:
    determining whether the exhaust gas temperature is increasing or decreasing; and
    increasing said correction amount when the exhaust gas temperature is increasing.

7. A method according to claim 6 wherein said correction amount determining step further includes the step of maintaining said correction amount as it is when said exhaust gas temperature is decreasing.

8. A method according to claim 1 wherein said first determining step further includes the steps of:

determining the difference between said exhaust gas temperature and said predetermined value;

determining a correction amount from said difference; and correcting the injection fuel amount by said correction amount.

9. A method according to claim 8 wherein said correction amount determining step further includes the steps of:

determining whether the exhaust gas temperature is increasing or decreasing; and decreasing the correction amount when the exhaust gas temperature is decreasing.

10. A method according to claim 8 wherein said correction amount determining step further includes the step of maintaining said correction amount as it is when said exhaust gas temperature is increasing.

11. An apparatus according to claim 3 wherein said microcomputer means determines the difference between said exhaust gas temperature and said predetermined value, determines a correction amount from said difference, and corrects the injection fuel amount by said correction amount.

12. An apparatus according to claim 11 wherein said microcomputer means, when the exhaust gas temperature is higher than said predetermined value, determines whether the exhaust gas temperature is increasing or not and reduces said correction amount when the exhaust gas temperature is not increasing.

13. An apparatus according to claim 11 wherein said microcomputer means, when said exhaust gas temperature is lower than said predetermined value, determines whether the exhaust gas temperature is increasing or not, and increases said correction amount when the exhaust gas temperature is increasing.

14. An apparatus according to claim 13 wherein said microcomputer means, when said exhaust gas temperature is lower than said predetermined value, maintains the correction amount as it is when said exhaust gas temperature is not increasing.

15. An apparatus according to claim 4 wherein said air-fuel ratio sensor is provided downstream of said turbine.

* * * * *